E. Nougaret.
Wool-Washing Mach.
N° 97,682. Patented Dec. 7, 1869.

Witnesses.
C. Hinchman.
Jno. A. Brooks.

Inventor.
E. Nougaret.
per Munn & Co.
Attys.

United States Patent Office.

EMILE NOUGARET, OF NEWARK, NEW JERSEY.

Letters Patent No. 97,682, dated December 7, 1869; antedated December 1, 1869.

IMPROVEMENT IN MACHINES FOR WASHING WOOL.

The Schedule referred to in these Letters Patent and making part of the same.

*To all whom it may concern:*

Be it known that I, EMILE NOUGARET, of Newark, Essex county, New Jersey, have invented a new and improved Machine for Washing and Rinsing Wool; and I do hereby declare that the following is a full, clear, and exact description thereof, which will enable others skilled in the art to make and use the same, reference being had to the accompanying drawings, forming part of this specification, in which—

Similar letters of reference indicate corresponding parts.

Figure 1:
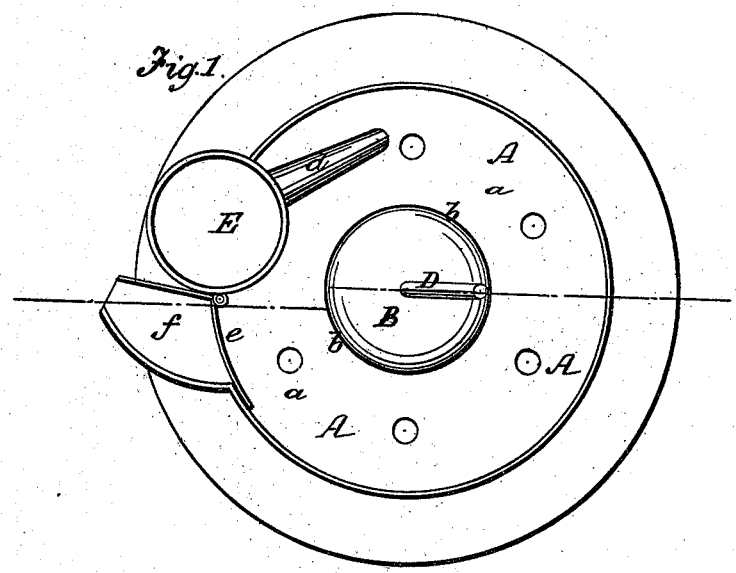
Figure 1 represents a plan or top view of my improved wool-washing machine.

This invention has for its object to provide a simple machine for washing and rinsing wool with the aid of warm or cold water, or other liquid.

The invention consists chiefly in the arrangement of an annular vessel, in which the wool to be washed is kept in constant motion, by a stream of water falling in an inclined direction upon it, so that the force of the water will serve to move the wool.

A, in the drawing, represents an annular vessel, made of metal or other suitable material, and provided with apertures through the bottom $a$, and through the inner sides $b$.

The cylinder B, formed within the vessel A, has an up-and-down adjustable-valve, C, which is fastened to a handle, D, that is screwed to its supports.

By turning the handle D the valve will be more or less elevated or lowered to leave the opening $c$, over which it works, as far opened as desired.

The wool to be washed is placed into the annular vessel A.

Figure 2:
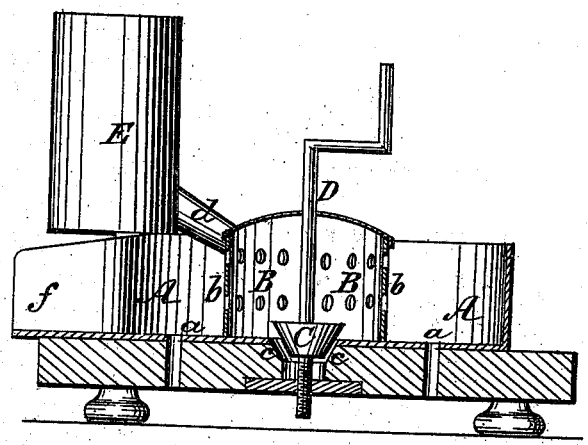
Figure 2 is a vertical central section of the same.

From a reservoir, E, which contains the cleaning liquid, and which is secured in suitable manner above the vessel A, leads an inclined spout, $d$, downward toward the vessel A, as in fig. 2.

The liquid escaping from the vessel E, in an inclined stream, forces the wool in the vessel A around, and brings therefore fresh wool constantly under its action. The machine is thus kept in motion by the force of the liquid from the reservoir.

The soiled water or liquid escapes partly through the holes in the bottom $a$, partly through those in the inner sides $b$, the valve C regulating its escape from the cylinder.

When the wool is to be discharged from the vessel, a gate, $c$, which, when closed, forms part of the outer side of A, is opened to let the contents of A flow out into a channel provided for that purpose.

Having thus described my invention,

What I claim as new, and desire to secure by Letters Patent, is—

A wool-washing machine, consisting of the annular vessel A, and elevated reservoir E, all arranged and operating substantially as herein shown and described, so that the cleaning liquid will serve to keep the wool in motion within the vessel A, as specified.

EMILE NOUGARET.

Witnesses:
 FRANK BLOCKLEY,
 ALEX. F. ROBERTS.